United States Patent [19]

Kolesinski

[11] Patent Number: 5,211,993
[45] Date of Patent: May 18, 1993

[54] METHOD OF MAKING NOVEL SEPARATION MEDIA

[75] Inventor: Henry S. Kolesinski, Atkinson, N.H.

[73] Assignee: Advanced Surface Technology, Inc., North Billerica, Mass.

[21] Appl. No.: 625,204

[22] Filed: Dec. 10, 1990

[51] Int. Cl.$^5$ .................. B05D 3/00; B05D 7/00
[52] U.S. Cl. .................. 427/488; 427/220; 427/533; 502/401; 502/402; 502/439; 210/198.2; 210/656
[58] Field of Search .................. 210/198.2, 656, 635, 210/502.1; 204/165, 168; 55/16, 68, 158, 67, 386; 427/34, 201, 248.1, 255, 220, 488, 533; 502/439, 402, 401; 522/153, 154

[56] References Cited

U.S. PATENT DOCUMENTS

| 4,045,353 | 8/1977 | Kosaka et al. | 210/198.2 |
| 4,056,456 | 1/1977 | Sano et al. | 204/165 |
| 4,129,489 | 12/1978 | Christenson et al. | 204/165 |
| 4,272,378 | 6/1981 | Sano et al. | 210/500.35 |
| 4,330,406 | 5/1982 | Sano et al. | 210/500.35 |
| 4,415,631 | 11/1983 | Schutijser | 210/198.2 |
| 4,830,752 | 5/1989 | Shibata et al. | 210/198.2 |
| 5,013,338 | 5/1991 | Anand et al. | 427/488 |
| 5,134,110 | 7/1992 | Sudo et al. | 502/401 |

OTHER PUBLICATIONS

H. Figge et al., Journal of Chromatography, 351, pp. 393–408 (1986).
H. Yasuda, "Plasma Polymerization", pp. 1–3, Academic Press, Orlando, Fla. (1985).
N. Petsev et al., God. Sofii. Univ., Khim, Fak., vol. 72, pp. 73–79 (1977) (English abstract only).
N. Petsev, Izv. Khim., 15, pp. 102–113 (1982) (English abstract only).
T. Kitade et al., Bunseki Kagakn, 32(6), pp. 368–373 (1983) (English abstract only).

Primary Examiner—Robert A. Dawson
Assistant Examiner—Sun Uk Kim
Attorney, Agent, or Firm—Schiller & Kusmer

[57] ABSTRACT

Method of chromatographically separating a mixture by contacting said mixture under chromatographic separation conditions with a chromatographic separation stationary phase comprising a polymer formed by coating substantially all of the surfaces of a microporous, comminuted substrate material with a monomer that is subsequently polymerized in situ with a cold-gas plasma discharge.

7 Claims, 3 Drawing Sheets

METHOD OF MAKING NOVEL SEPARATION MEDIA

This invention relates to chromatographic stationary phases and a method of making such phases for use in chromatographic separations.

The separation of materials by chromatographic techniques is well known. Particularly, high performance liquid chromatography (hereinafter HPLC) possesses significant advantages over most other separation modes for biopolymers, especially with regard to the ability to retain biological activity, maintain monomer-/aggregate stability and species, provide rapid sample analysis, offer high quality resolution, require low sample consumption, yield accurate and precise quantification, allow automatic injection-separation-detection-data processes, and offer excellent selectivity derived from numerous separation modes. Consequently, the discussion hereinafter will be primarily directed to liquid chromatography, but it is to be understood that the principles of the present invention may, in many instances, be applied to gas chromatography, capillary zone electrophoresis, capillary chromatography and the like as well.

A large number of chromatographic separation modes are currently available and include, for example, cation/anion exchange, size exclusion, hydrophobic interaction, reversed phase, affinity, diol/amine/ cyano bonded phase, base silica-alumina, displacement, frontal and others. Within each of these modes, there are diversities in terms of possible mobile phases, gradient type, flow rates, pH, ionic strength, organic/aqueous ratios, salt concentration, particle size, particle size distribution, pore size, surface area, surface activity, carbon loading/coverage, meq ionic site/gram packing, loading capacity, peak capacity, etc.

It has long been known that the stationary phases for liquid chromatography require certain chemical and physical properties For example, where a bonded phase is disposed on support material, the latter typically may be formed of small spheres or irregular particles of strength sufficient to resist crushing in the process of packing same into a column, and possess desired pore diameters, pore volume and pore volume distribution. Such support material should be chemically pure and surface groups should be distributed substantially homogeneously. The bonded phase or coating is typically immobilized on the support so as not to adversely alter the kinetics of the support or the chromatographic stability. The immobilized layer should be relatively chemically and physically stable, mass transfer should not be restricted within the layer and the synthesis of the layer should be convenient and highly reproducible.

The vast majority of packings for HPLC are typically formed of irregular or spherical beads of silica, organic polymers and polysaccharides generally about 5 to 70 um in diameter, formed into pellicles having a thin overlayer of bonded phase that may be a rigid solid, or hard or soft gel. The use of some alumina and zirconia supports has been reported. Generally these supports are produced by coating preformed polymers onto the surfaces of the base materials, immobilization of the polymer films being achieved by some cross-linking technique. Such prior art stationary phases may, for example and depending upon the functionality desired, contain diol, ether, amino, amide, C18, C8, C2, phenyl, cyclohexyl groups and the like.

The advantages of using immobilized polymer-coated stationary phases in HPLC have been summarized by H. Figge et al, J. Chromatogr. 351, 393 (1986). The separation efficiency and sample capacity obtained with such stationary phases are comparable with silanized silicas. Oligomers, substituted by different polar groups such as cyano, can also be immobilized in order to provide particular polarities. The synthesized materials also exhibit superior long-term stability with respect to loss of stationary phase at operation with highly polar or extremely non-polar mobile phases.

This prior art has encountered some serious problems. The molecular weight range of the polymers that are coated is critical, depending upon the pore size distribution of the base support. The polymers may thus be prevented from entering smaller pores in the base material, resulting in incomplete coverage. Alternatively the pores may become filled resulting in puddling of the polymer with concomitant changes in pore size distribution so that the immobilization reactions may be relatively inefficient, resulting in variable carbon loadings. Where the support is siliceous, the coating is usually bound to the substrate usually through reaction with surface silanol groups, but can be attached through other mechanisms. For example, polyvinyl-pyrrolidones, polybutadienes and polyethyleneimine have been immobilized on silica substrates, through thermal treatment, gamma-radiation, peroxide initiated polymerization, or chemical cross-linking. The use of silica supports is widespread for their low cost, the high column efficiency achieved, the good mechanical stability achieved under high pressure, and the ready availablity of a wide range of particle sizes and porosities. Further, the stationary phase often does not or cannot cover or shield all of the silanol groups on a siliceous substrate. In such case, reactions can occur between those groups and, for example, proteins, amines and the like when attempting to separate solutions containing the latter, resulting in undesirable peak-tailing, high levels of non-specific binding and poor recovery of these materials. Where the surface of the support, whether silica or other material, is completely covered, as by coating polybutadiene onto a surface and cross-linking it through a peroxide reaction, the result is a commercially available, selective surface.

Chromatography grade silica comes in many sizes, shapes, porosities and surface areas. Silicas obtained from different suppliers may radically differ. Even from the same supplier, minute differences in morphology, chemical composition and surface chemistry may vary from lot to lot, and may effect the silane bonding in a manner that translates into different chromatographic performance. Therefore, reproducibility is an important issue in producing silica-based chromatographic supports.

A number of other substrate materials, such as alumina, magnesia, titania, zirconia and the like have also been used as supports in stationary chromatographic phases, but the practicality of such alternative inorganic support materials depends rather heavily upon the ability to couple functional organic stationary phases to their surfaces. Organic polymers have been immobilized on such alternative inorganic supports by cross-linking rather than by covalent bonding to the surface. Such cross-linking has generally been achieved by reaction with radical starters such as peroxides, or by hard irradiation such as gamma rays and electron beams. Covalently bonded phases have not been particularly successful insamuch as the attachment chemistry does not lead to stable mobile phase attachments.

The term "plasma polymerization" as used herein generally refers to the deposition of polymeric films or coatings from organic and semi-organic precursors by subjecting vapors of the latter to a glow discharge. As pointed out by H. Yasuda, "Plasma Polymerization", Academic Press, Orlando, Fla., (1985), the term is somewhat of a misnomer since the materials formed in this manner are not conventional polymers which are formed by the linking of molecular units, i.e., monomers, without changes in the units. Because the ionization of a vapor or gas produces many different, highly energetic species that can react in many different ways, the structure formed is quite different than that obtained in conventional polymerization processes.

Plasma polymerization has been used to prepare stationary phases for glass capillary gas chromatography. See for example N. Petsev et al, CA97(2):12284M; N. Petsev, Izv, Khim., 15, 102–113 (1982); and T. Kitade et al, Bunseki Kagakn, 32(6) 368–73 (1983). Generally the reaction conditions required volatilization of the monomers in the plasma environment with subsequent polymerization from the gas phase onto the surface of the substrate. That surface coverage of porous substrate material was not complete is evidenced by peak tailing, although the interpretation was that the film was gas-permeable.

The present invention, therefore, has as its principal object, provision of a novel separation medium or chromatographic stationary phase and the methods of manufacturing and using same. Yet other objects of the present invention are to provide such chromatographic stationary phases formed of porous or non-porous base supports coated with specific, chromatographically functional monomers that are subsequently plasma polymerized in situ; to provide such stationary phases that include a highly cross-linked, substantially pin-hole free polymeric coating; and to provide a process for making such supports without a large chemical facility, or the use of large quantities of reactants and wash solvents, or long reaction times.

Because the coating and immobilization of the polymers of the present invention onto substrate materials can be achieved without involving silane chemistry, a wide variety of substrates can be employed, particularly those that, unlike silica, are alkali-stable.

Other objects of the present invention will in part appear obvious and will in part appear hereinafter. The invention accordingly comprises the product possessing the features, properties and relation of components, and the method involving the several steps and the relation and order of one or more of such steps with respect to each of the others, all of which are exemplified in the following detailed disclosure and the scope of the application of which will be indicated in the claims.

For a fuller understanding of the nature and objects of the present invention, reference should be had to the following detailed description taken in connection with the accompanying drawings wherein.

Figure 7:
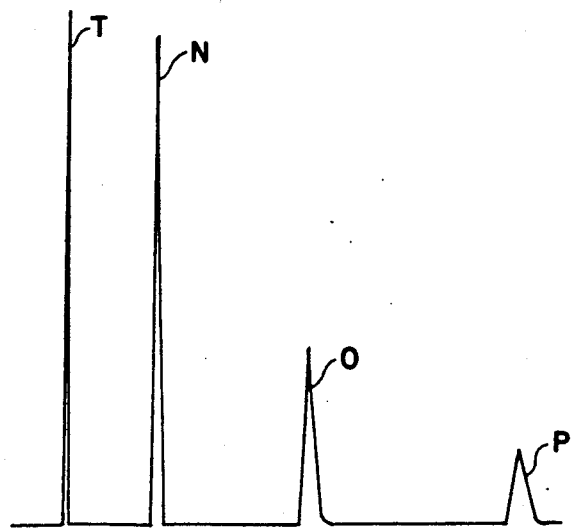
Figure 8:
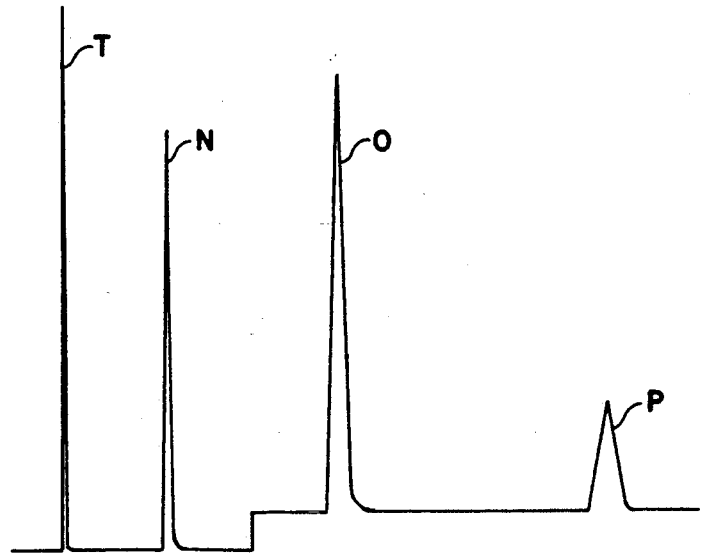

FIG. 7 is a chromatogram showing chromatographic results in separating polar molecules using a column of silica particles coated by plasma-induced polymerization of methoxy polyethylene glycol mono-methacrylate in accordance with the principles of the present invention; and FIG. 8 is a comparative control chromatogram obtained using the same materials and conditions as those used to obtain the results of FIG. 7, except that the normal phase chromatographic column is made of Deltabond PEG in accordance with the prior art.

Generally, the present invention involves a method of making a chromatographically active support material by first coating the surface of comminuted, substrate material with a monomer, and subsequently inducing polymerization, with a gas plasma, of the monomer coated on the surface of the substrate material. Another important aspect of the present invention is the method of chromatographically separating a mixture by contacting the latter, under chromatographic separation conditions, with the aforesaid comminuted, substrate material substantially the entire surfaces of which have been coated with a monomer that was polymerized by exposure to a gas plasma.

To effect the method of the present invention, appropriate support material, in the form of a selected amount of a microporous, finely comminuted inorganic support material, is mixed with a solution of a selected monomer at a known concentration level. The monomer is coated evenly on the surface of the powder by evaporating the solvent, for example under a vacuum, from the solution while agitating the mixture, typically in a rotary evaporator. One may also incorporate in the coating solution an appropriate amount of other polymer which initially then can serve as a binder. The surface film provided can readily be pre-established knowing the surface area of the amount of powder employed and the amount of monomer used. The monomer coated material is then available as a substantially free-flowing powder. The latter is then placed in a rotating plasma reactor with or without a binder as the case may be, where it is tumbled while being subjected to a gas-plasma environment until polymerization of the monomer is achieved. In the event a polymeric binder is used, the subsequent polymerization of the monomer may produce a graft polymer or, if no chemical reaction should occur, then the resulting coating includes an interpenetrating network of the two polymers.

It is to be understood that because the polymer coating achieved through the present invention is immobilized on the substrate material by polymerization and not necessarily by covalent bonding, a wide variety of substrate materials may be employed. Preferred materials are silica, alumina, magnesia, titania and zirconia, typically as finely comminuted material or powder the particles of which are in the range of about 3 to 300 micron in average diameter, a preferred range of particle diameters being between about 5 to 20 microns. Further, a wide variety of monomers may be used as coatings in the present invention. Polymers and copolymers may be prepared using monomers and unsaturated polymers, including, but not limited to vinyl monomers such as vinyl stearate, vinyl octadecyl ether, N-vinyl pyrrolidone, and many other monomers such as allyl imidazole, octadecyl methacrylate, methyl methacrylate, acrylamide-2-methyl-propane sulfonic acid, acetylene dicarboxylic acid, methacrylamido propyl dimethyl ammonium chloride, N-methacryloyl-L-alanine, and comonomers such as polyethylene glycol, methoxy polyethylene glycol methacrylate, polyethylene glycol dimethacrylate, polybutadiene, polybutadiene maleic acid, poly-styrene-butadiene, unsaturated oligomers of urethanes, epoxides, esters and the like. As gas plasmas, one may employ any of the noble gases such as argon, xenon and the like, or other gases such as nitrogen and the like.

Figure 1:
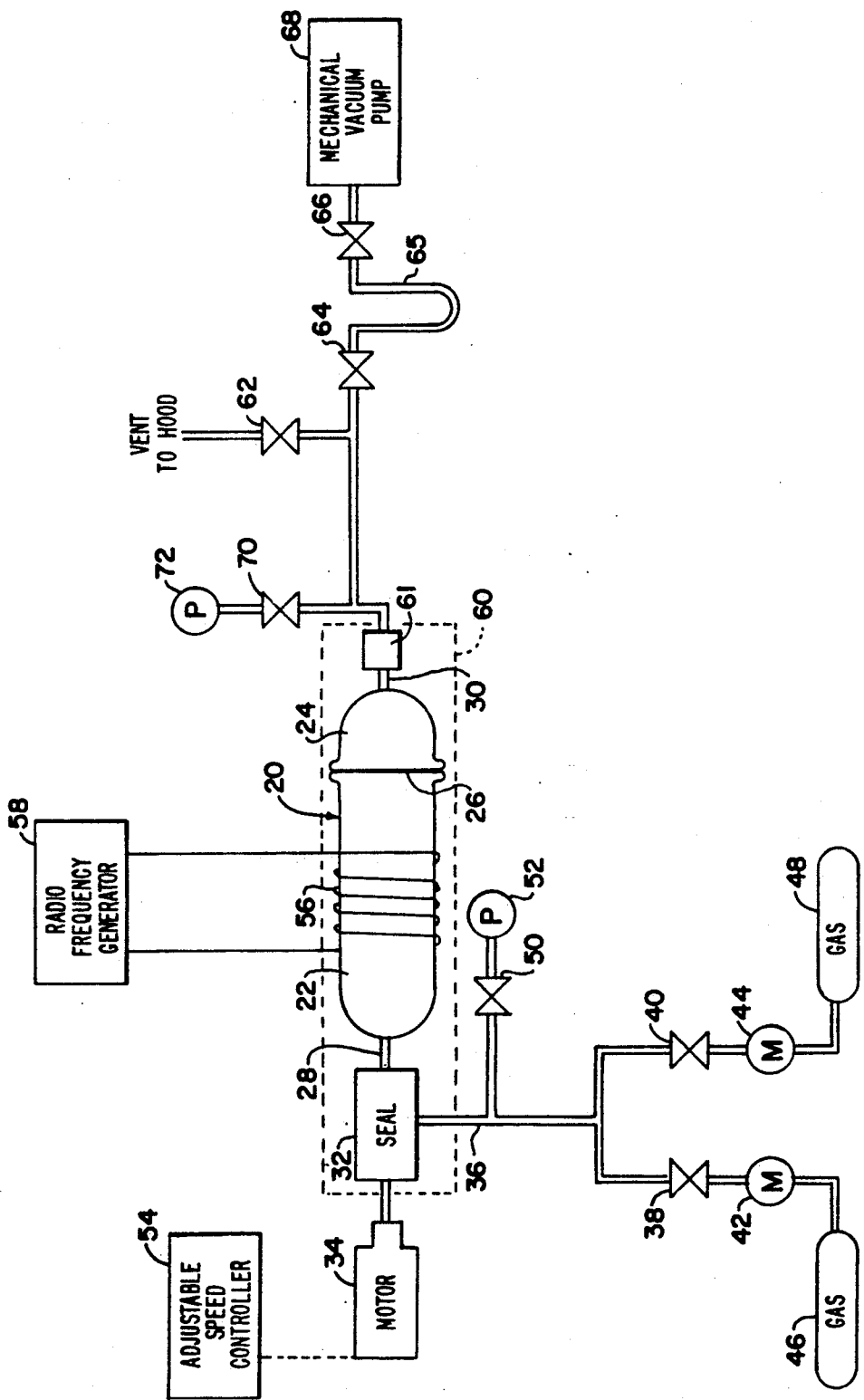
FIG. 1 is a schematic diagram showing a reactor system for effecting plasma-enhanced polymerization of the chromatographic materials of the present invention.

FIG. 1 is illustrative of exemplary equipment for effecting manufacture of the separation medium of the present invention, as described in the Examples set forth hereinafter. The system of FIG. 1 includes reaction chamber 20, typically in the form of an elongated glass container comprising two separable sections 22 and 24 sealed together by 0-ring 26, the opposite ends of sections 22 and 24 being respectively supported by and connected to hollow tubes 28 and 30. The necessary support structure and bearings for the rotation mechanism are not shown for the sake of clarity in the drawing. Tube 28 is coupled through rotating vacuum seal 32 to motor 34 so that the latter can drive chamber 20 in rotation using tube 28 as a drive shaft while also permitting the interior of tube 28 to be coupled to the interior of inlet conduit 36. Conduit 36 is connectable through needle valves 38 and 40 and respective associated mass-flow meters 42 and 44 to sources 46 and 48 of gases to be converted to plasmas, and is also connectable through valve 50 to capacitance manometer 52 for measuring pressure of gas provided by the respective sources. Appropriate electrical control means 54 are preferably provided for adjustably controlling the speed of rotation of motor 34.

Chamber 20 is mounted within electrical winding 56 connected to radio frequency generator 58, typically capable of generating an electrical field at 13.56 MHz at 25 watts within chamber 20. Chamber 20 and winding 56 are surrounded by shielding such as perforated copper cage 60.

Tube 30 is connectable through vacuum seal 61 and thence stopcock 62 to vent the interior of tube 30 and of chamber 20. Tube 30 is also connectable through first vacuum valve 64 to liquid nitrogen trap 65 and thence through second vacuum valve 66 to vacuum pump 68. Valve 70 and another capacitance manometer 72 are provided for measuring the vacuum provided in chamber 20 by pump 68.

In use, chamber 20 of the apparatus of FIG. 1 is opened, appropriate quantities of free flowing support material and a solution of a selected monomer in a volatile organic solvent are placed in chamber 20, and the latter is sealed against O-ring 26. Chamber 20 is rotated by motor 34 and is pumped down to a relatively low pressure until the monomer in solution is physically coated onto the surface of the support material and the solvent is evaporated. This provides a thin film of monomeric coating over each particle of the support material, leaving the latter as a free flowing powder again. Gas, such as argon, from one or more of sources 46 and 48 is bled slowly into the chamber until the gas is at a relatively low pressure, and then generator 58 is energized to provide an appropriate field strength to convert the gas to a cold plasma. For example, the plasma conditions would use argon gas at 60 utorr presure in a 25 watts field for 15 minutes. Following exposure to the plasma, the chamber is vented and opened, and the samples therein are removed, triturated with solvent to remove any unreacted monomer, filtered, washed and dried under vacuum. The sample is then evaluated by thermogravimetric analysis to determine the efficiency of the plasma polymerization.

The following Examples illustrate more clearly the manner and conditions under which the novel separation media can be provided and used according to the present invention. The invention should, however, not be construed as limited to the particular embodiments set forth in the Examples which are to be considered merely exemplary.

EXAMPLE 1

A layer of vinyl stearate monomer, calculated to be about 10 A thick, is coated onto silica powder (Hypersil Silica obtainable from Keystone Scientific, Inc.) having an average particle diameter of 5 um, average pore size of 120 A and a surface area of about $170M^2/gm$, subjected as above described to an argon plasma for 30 minutes at 25 watts, triturated with solvent to remove unreacted vinyl stearate, filtered, washed and dried under vacuum.

Figure 2:
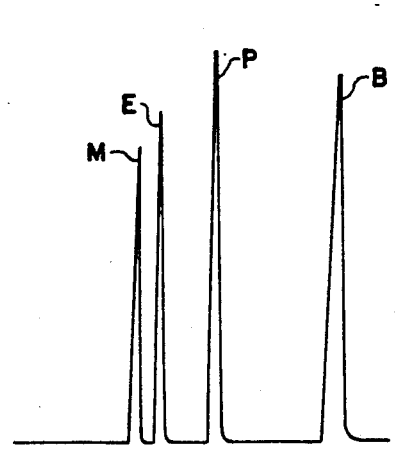
FIG. 2 is a chromatogram showing chromatographic results in separating neutral molecules using a column of silica particles coated, in accordance with the principles of the present invention, by plasma-induced polymerization of vinyl stearate.

The chromatographic performance of the resulting reverse phase plasma-initiated coating is evaluated by packing the medium into a stainless steel separation-column support tube. The reverse phase separation of neutral compounds is evaluated with neutral molecules, e.g., methyl, ethyl, propyl and butyl parabens in a mobile phase of 30/70 acetonitrile/water at 1.25 ml/min, with UV detection at 254 nm under isocratic conditions. The resulting chromatogram is shown in FIG. 2 in which the peaks identified as M, E, P and B are respectively due to the methyl, ethyl, propyl and butyl parabens.

EXAMPLE 2

Figure 3:
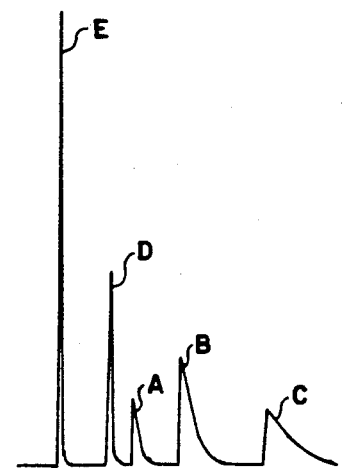
FIG. 3 is a chromatogram showing chromatographic results in separating basic molecules using the column similar to that used in FIG. 2.
Figure 4:
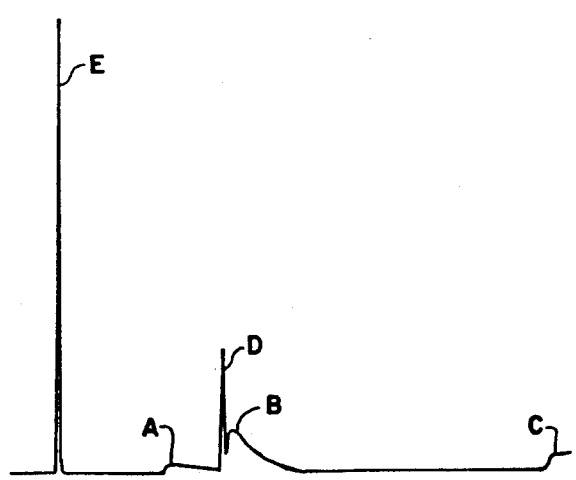
FIG. 4 is a comparative control chromatogram obtained using the same materials and conditions as those used to obtain the results shown in FIG. 3, except that the reverse phase chromatographic column is made of Hypersil ODS according to the prior art.

The reverse phase separation of basic compounds by the column of reverse phase plasma-coated medium of Example 1 is evaluated with neutral markers and basic analytes such as uracil, caffeine, procainamide, N-acetyl procainamide and N-propyl procainamide in a mobile phase of 90/10 0,05 M $KH_2PO_4$/acetonitrile, pH 3.5 at 1.25 ml/min, with UV detection at 254 nm under isocratic conditions. The resulting chromatogram is shown in FIG. 3 in which peaks A, B and C are due respectively to the procainamide, N-acetyl procainamide and N-propyl procainamide, peak D is due to caffeine and peak E is due to uracil. Shown in FIG. 4 for comparison purposes is a control chromatogram obtained using the same materials and conditions with a standard chromatographic column of reverse phase Hypersil ODS.

EXAMPLE 3

Figure 5:
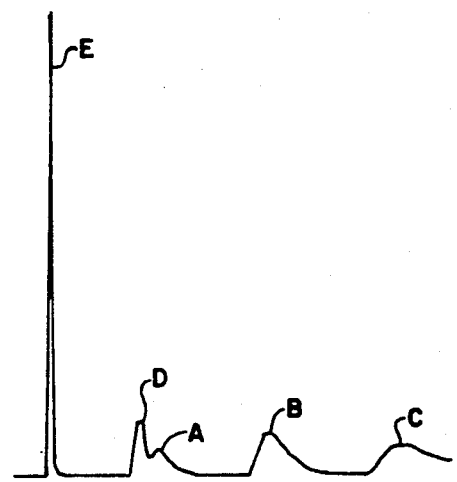
FIG. 5 is a chromatogram showing chromatographic results in separating basic molecules using a column similar to that used to obtain the results of FIG. 2, but coated by plasma-induced polymerization of vinyl octadecyl ether in accordance with the principles of the present invention.

A reverse phase separation medium is prepared according to Example 1, except that the monomer is vinyl octadecyl ether, coated onto silica (Hypersil Silica obtainable from Keystone Scientific, Inc.) having an average particle diameter of 5 um, average pore size of 120 A and subject to an argon plasma for 30 minutes at 25 watts. The resulting separation column is evaluated for chromatographic performance with the same mobile phases used in Example 2. The resulting chromatogram is shown in FIG. 5 wherein the respective peaks are identified in the same manner as in FIGS. 3 and 4.

EXAMPLE 4

Figure 6:
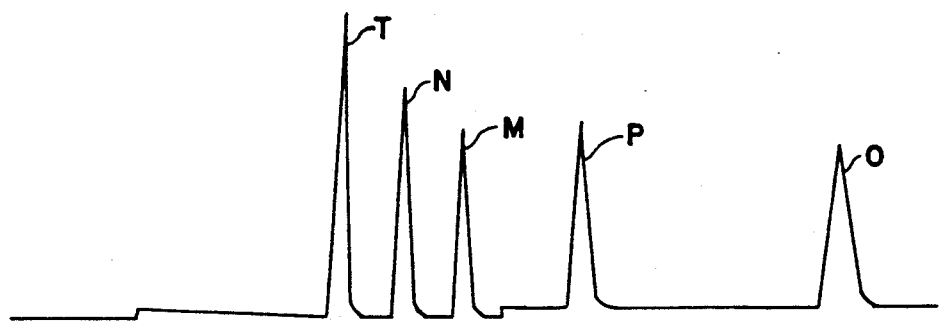
FIG. 6 is a chromatogram showing chromatographic results in separating neutral molecules in a column formed by plasma-induced polymerization of stearyl methacrylate on alumina in accordance with the principles of the present invention.

A reverse phase separation medium is prepared according to Example 1, except that the monomer was stearyl methacrylate coated with the argon plasma for 30 minutes at about 25 watts onto alumina powder (obtainable from Biotage Co.) having an average particle diameter of 8 um and a surface area of about 50M$^2$/gm, and evaluated with neutral molecules of theophylline, p-nitro analine, methyl benzoate, phenetole, and o-xylene, the resulting peaks being respectively identified by the letters T, N, M, P and O in the resulting chromatogram shown in FIG. 6.

EXAMPLE 5

A normal phase separation medium is prepared according to Example 1, except that the monomer is methoxy polyethylene glycol 1000 monomethacrylate coated onto the silica powder having an average particle diameter of 5 um, average pore size of 120 A and a surface area of about 170M$^2$/gm, and subjected to an argon plasma for 30 minutes at 25 watts. The normal phase separation is evaluated using a polar compound, e.g., toluene, nitrobenzene, o-nitroaniline and p-nitroaniline in a mobile phase of isooctane/ ethanol/ water (85/15/0.3) at 1.25 ml/min, with UV detection at 254 nm under isocratic conditions. The resulting chromatogram is shown in FIG. 7 in which the resulting peaks due to the respective compounds in the sequence above-identified are marked T, N, O and P.

Since certain changes may be made in the above methods and product without departing from the scope of the invention herein involved, it is intended that all matter contained in the above description or shown in the accompanying drawing shall be interpreted in an illustrative and not in a limiting sense.

What is claimed is:

1. Method of making a chromatographically active support material, said method comprising the steps of:
   coating the surfaces of a comminuted inorganic substrate material with a monomer selected from those monomers which, when polymerized, possess chromatographic properties; and
   exposing said monomer coated on said surface to an inert gas plasma for a time and of an intensity sufficient to induce polymerization of said monomer.

2. Method as defined in claim 1 wherein said monomer is vinyl stearate.

3. Method as defined in claim 1 wherein said monomer is vinyl octadecyl ether.

4. Method as defined in claim 1 wherein said monomer is polyethylene glycol 1000 monomethacrylate.

5. Method as defined in claim 1 wherein said monomer is stearyl methacrylate.

6. Method as defined in claim 1 wherein said monomer is in solution during said step of coating.

7. Method as defined in claim 6 including the step of adding a polymeric material to said solution in sufficient amount to serve as a binder to aid the step of coating.

* * * * *